United States Patent
Laval

(10) Patent No.: US 8,775,534 B2
(45) Date of Patent: Jul. 8, 2014

(54) METHOD AND SYSTEM FOR E-MAIL ENHANCEMENT

(76) Inventor: Philippe Laval, Vanves (FR)

(*) Notice: Subject to any disclaimer, the term of this patent is extended or adjusted under 35 U.S.C. 154(b) by 312 days.

(21) Appl. No.: 13/124,491

(22) PCT Filed: Oct. 16, 2009

(86) PCT No.: PCT/FR2009/051985
§ 371 (c)(1),
(2), (4) Date: Apr. 15, 2011

(87) PCT Pub. No.: WO2010/043830
PCT Pub. Date: Apr. 22, 2010

(65) Prior Publication Data
US 2011/0202621 A1 Aug. 18, 2011

(30) Foreign Application Priority Data
Oct. 17, 2008 (FR) ...................................... 08 57051

(51) Int. Cl.
*G06F 15/16* (2006.01)
(52) U.S. Cl.
USPC ............ 709/206; 715/751; 715/753; 709/220
(58) Field of Classification Search
CPC ...... G06Q 10/107; G06Q 10/00; G60F 17/21; G60F 15/16; H04N 21/4782; H04W 4/02
USPC .................. 709/206, 218; 715/513, 234–242, 715/751–753; 707/755, 736; 713/171
See application file for complete search history.

(56) References Cited

U.S. PATENT DOCUMENTS

| 4,965,763 | A | 10/1990 | Zamora |
| 6,092,114 | A * | 7/2000 | Shaffer et al. .................. 709/232 |
| 7,054,886 | B2 | 5/2006 | Stern et al. |
| 7,178,099 | B2 * | 2/2007 | Meyer et al. .................. 715/210 |

(Continued)

FOREIGN PATENT DOCUMENTS

WO 0153984 A 7/2001

OTHER PUBLICATIONS

Simon Scerri et al: "Semantic Email as a Communication Medium for the Social Semantic Desktop", The Semantic Web: Research and Applications; [Lecture Notes in Computer Science], , vol. 5021,Jun. 3, 2007, pp. 124-138, Springer Berlin Heidelberg, Berlin, Heidelberg, XP019075687.

(Continued)

*Primary Examiner* — Andrew Chriss
*Assistant Examiner* — Romani Ohri
(74) *Attorney, Agent, or Firm* — Young & Thompson

(57) ABSTRACT

A method for enhancing an electronic message, referred to as an e-mail, upon receiving the same in the e-mail inbox of a user, the method includes the following steps: a local application, working with the e-mail inbox and extracting a set of data contained in the incoming e-mail, sends the data set to a remote server, receives a response from the remote server, and attaches the response to the incoming e-mail; and the remote server receives the data set sent by the local application, analyzes the data so as to identify specific elements, and sends the specific elements as a reply to the local application. The invention relates to the exchange of structured information by e-mail, and in particular to scheduling appointments, contact details, and monitoring tasks to be performed.

20 Claims, 2 Drawing Sheets

(56) References Cited

U.S. PATENT DOCUMENTS

| | | | | |
|---|---|---|---|---|
| 2002/0143871 | A1* | 10/2002 | Meyer et al. | 709/204 |
| 2005/0015457 | A1* | 1/2005 | Warasawa | 709/207 |
| 2005/0076085 | A1* | 4/2005 | Budd et al. | 709/206 |
| 2005/0086477 | A1* | 4/2005 | Lin et al. | 713/171 |
| 2007/0038718 | A1* | 2/2007 | Khoo et al. | 709/206 |
| 2007/0168439 | A1* | 7/2007 | Koch | 709/206 |
| 2007/0260872 | A1* | 11/2007 | Filipi-Martin et al. | 713/153 |

OTHER PUBLICATIONS

Bellotti V et al: "Flannel: Adding Computation to Electronic Mail During Transmission", UIST 02: Proceedings of the 15th. Annual ACM Symposium on User Interface Software and Technology. Oct. 27, 2002, pp. 1-9, vol. 4, Issue 2, XP001171562.

McMichael DW et al: "Semnutica: A system for semantic extraction and logical querying of text corpora", Intelligence and Security Informatics, 2008, Jun. 17, 2008, pp. 277-278, XP031286494.

Abiteboul Setal: "OptimAX: Optimizing Distributed Active XML Applications", Eighth International Conference on Web Engineering, Jul. 14, 2008, pp. 299-310, XP031290857.

Simon Corston-Oliver et al: "Task-focused Summarization of Email", Nternet Citation, [Online] Retrieved from the Internet: URL:http://acl.Idc.upenn.edu/acl2004/textsummarization/pdf/Corston.pdf>[retrieved on Oct. 17, 2006], XP007901210.

"Method and System of Dynamic Email Content Highlighting" IP.com Journal, Jul. 8, 2008, XP013125689.

International Search Report, dated Jan. 19, 2010, in PCT/FR2009/051985.

French Search Report, dated May 20, 2009, in FA 716325/FR 0857051.

* cited by examiner

METHOD AND SYSTEM FOR E-MAIL ENHANCEMENT

BACKGROUND OF THE INVENTION

1. Field of the Invention

The present invention relates to a method and a system making it possible to enhance an electronic message referred to as an e-mail, upon receipt thereof in a user's e-mail inbox.

2. Description of the Related Art

During about the last ten years e-mail has become the foremost medium of exchange between professionals. Gradually it is replacing paper letters, fax, telex and telephonic conversations. E-mail is a medium which can be used in a number of ways. In fact, e-mail is currently used to arrange meetings, to give instructions, to receive instructions, to plan work and retrieve information about contacts etc.

However, it is sometimes difficult to rapidly identify useful information which is buried within texts and annotations which are more or less useful.

Numerous systems exist for linguistic analysis which make it possible to process text in such a way as to highlight this useful information in the initial document or in a new document.

Document U.S. Pat. No. 4,965,763 describes a method for analyzing a document. This method consists of extracting parametric information from a document by identifying and targeting syntactic analysis on selected parts of this document. In fact, the start and end of documents are particularly analyzed in order to identify the following parametric information: author, date, receiver, address, subject, etc. The information thus obtained allows a very precise classification of the analyzed documents.

Document U.S. Pat. No. 7,054,886 describes a system which allows Internet browsing in order to recover a set of information and to set up a professional database. This information is generally extracted from Web pages using an "Extractor".

Document U.S. Pat. No. 7,178,099 describes a method allowing the enhancement of electronic messages referred to as e-mails upon receipt thereof in an e-mail inbox. This method uses a software application capable of intercepting the incoming e-mail, analyzing the content and the items attached to this e-mail so as to produce a new document referred to as an enhanced e-mail, in particular in HTML format, comprising said content as well as an index and other information such as for example a summary of the attached items. The content can be enhanced by incorporating colour into it so as to attract attention to certain words or other items. However, with such a method, the recipient of the e-mail only receives their message once all the operations of analyzing the e-mail's content, header and attached items have been carried out. Depending on the complexity and size of the e-mail and the attached items, the analysis process can take a significant amount of time and considerably delay delivery of the message to the recipient. The same situation can occur due to hardware reasons, the analysis is not successful, which inevitably blocks the e-mail.

SUMMARY OF THE INVENTION

A purpose of the present invention is to remedy the above-mentioned drawbacks by proposing a novel method for analyzing e-mail which is non-intrusive in the e-mail and does not block it as regards the user. A purpose of the invention is also a method for analyzing e-mail which is efficient and rapid.

At least one of the above-mentioned aims is achieved with a method for enhancing an electronic message referred to as an e-mail, upon receipt thereof in a user's e-mail inbox. According to the invention, this method comprises the following steps:

a local application, acting directly or not on the e-mail inbox, and which extracts a set of data contained in the incoming e-mail, transmits said set of data to a remote server, receives a response originating from the remote server, and attaches this response in the form of an attachment to said incoming e-mail, said remote server receives the set of data transmitted by the local application, analyzes the data so as to identify specific elements, and transmits these specific elements as a response to the local application.

In other words, the extraction of the set of data, consisting in particular of simply extracting the text contained in the e-mail, is carried out in a machine containing the e-mail inbox and different from the remote server. The latter carries out the demanding operations of identification of the specific elements, i.e. the linguistic analysis.

With the method according to the invention, the linguistic processing is advantageously carried out within a remote server to which significant hardware and software resources can be allocated so that this linguistic analysis is carried out rapidly and efficiently. By contrast, in the systems of the prior art, it is the user's processing unit which is required to do this analysis, which unnecessarily slows down the set of the operations taking place within this processing unit.

According to an advantageous feature of the invention, the local application and the remote server operate asynchronously so that the incoming e-mail can be consulted in the e-mail inbox by the user while the remote server carries out the data analysis. Therefore, the incoming e-mail is not blocked and its consultation by the user is not dependent on the linguistic analysis.

Advantageously, the local application can act on the e-mail inbox as a "plug-in", in other words a plug-in application of the application managing the e-mail inbox of the user. Communications between the local application and the remote server are of client-server type.

Preferably, the specific elements can comprise at least one of the elements chosen from the following group: date, time and location relating to a meeting, contacts or tasks.

Moreover, according to the invention, the response transmitted by the remote server can contain a structured representation of the specific elements. This representation can be of a graphic, textual or other type. It can be an index comprising the specific elements ranked in categories, optionally highlighting certain elements by underlining or colouring. Advantageously, the specific elements are formatted in predefined formats depending on their nature.

According to an embodiment of the invention, the local application can produce an item attached to the incoming e-mail based on the response transmitted by the remote server.

As a variant, it is the remote server which directly incorporates the specific elements into a document in the form of an attached item that the local application attaches to the incoming e-mail.

According to an advantageous embodiment of the invention, the local application produces and transmits a unique identifier to the remote server at the same time as the set of data. More precisely, this unique identifier can identify the user, identify the incoming e-mail, and/or comprise an IP address making it possible to locate the local application.

Generally, this method according to the invention allows the content of an e-mail to be enhanced by creating attached items repeating the information present in the text of the e-mail in a structured manner.

Advantageously, the attachment to the incoming e-mail is a document in HTML format containing at least one hypertext link. For that reason, the user may or may not validate the proposed structuring. He can also click on a hypertext link in order to access the Web or recover additional information from the remote server.

Preferably, said set of data comprises the text contained in the body and the header of the incoming e-mail as well as the nature of this incoming e-mail.

According to another aspect of the invention, a system is proposed for enhancing an electronic message referred to as an e-mail, upon receipt thereof in an e-mail inbox contained in a processing unit; this system implementing the method as defined previously.

According to the invention, the processing unit comprises a local application, acting on the e-mail inbox, which is capable of extracting a set of data contained in the incoming e-mail, transmitting said set of data to a remote server, receiving a response originating from the remote server, and attaching this response in the form of an attachment to said incoming e-mail.

The remote server is capable of receiving the set of data transmitted by the local application, analyzing the data so as to identify the specific elements, and transmitting these specific elements as a response to the local application.

Such an arrangement facilitates in particular updates which can be carried out directly on the remote server once and for all for several local applications.

BRIEF DESCRIPTION OF THE DRAWING FIGURES

Other advantages and characteristics of the invention will become apparent on examination of the detailed description of an embodiment which is in no way limitative, and the attached diagrams, in which.

DETAILED DESCRIPTION OF THE INVENTION

Figure 1:
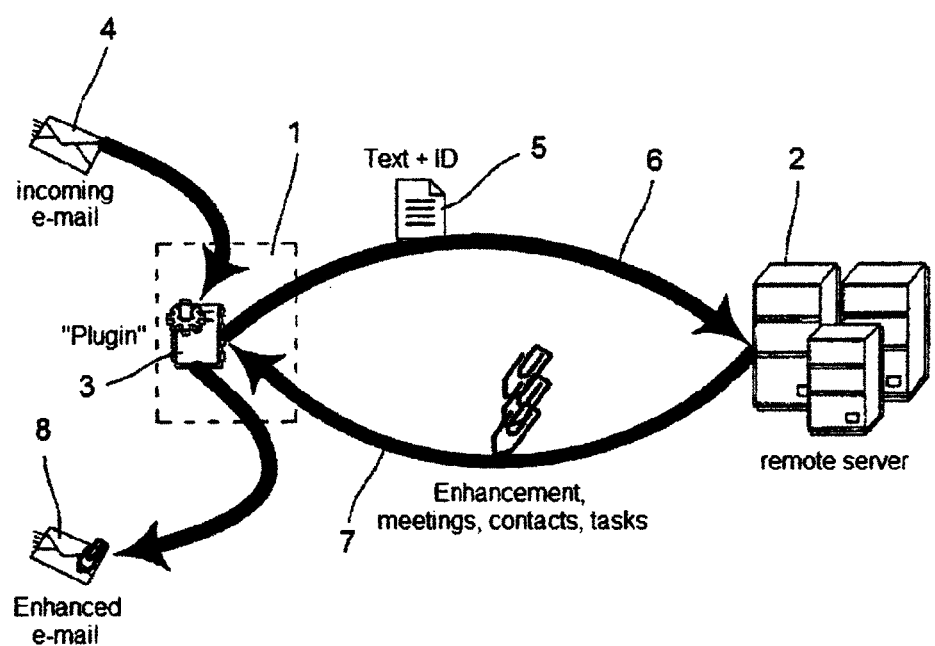
FIG. 1 is a diagrammatic view of a system according to the invention.

In FIG. 1, a system is shown comprising a processing unit 1 capable of connecting to a remote server 2 via a communication network of Internet type. The processing unit 1 is a desktop computer or a laptop computer provided with the hardware and software means necessary for accessing the communication network and making the human-machine interface possible. It is driven by an operating system which manages and coordinates different applications and hardware. In particular, the processing unit 1 comprises an e-mail management application such as for example Outlook® or another.

According to the invention, the processing unit also comprises a local application 3 such as a "plug-in" which can take the form of an additional application or "add-in" incorporated into the different e-mail management applications such as Outlook. The local application 3 can also be presented in the form of a "GreaseMonkey" script for Google®'s "Webmail" application Gmail®.

The remote server 2 is provided with conventional hardware and software means for correct operation within a communication network. Advantageously, it also comprises a linguistic analysis module, in particular as disclosed in one of the documents of the prior art indicated above.

The architecture implemented in the system according to the invention is therefore made up of two distinct components:
 a local application 1 associated with the e-mail management application, and;
 a remote server 2.

The role of the local application 1 is:
 to extract the text 5 from the incoming e-mail 4;
 to transmit it in 6 to the remote server 2 with an identifier Id unique to the user;
 to receive in 7 the response from the remote server 2;
 to attach this response in the form of an attachment to the e-mail and to produce an enhanced e-mail 8, and optionally propose actions to the user depending on the elements returned by the remote server 2.

The role of the remote server 2 is to offer an entry point in the form of "Web Service" using SOAP or REST architecture which makes it possible:
 to receive the text 5 and the user identifier Id;
 to analyze the text in order to extract specific elements which are structured data representative of meetings, contacts or tasks 9; and
 to return this structured data in 7.

Preferably, the communication between the application software and the remote server is of asynchronous type so as not to block the operation of the e-mail management application such as Outlook or another. In FIG. 1, when the e-mail 4 arrives, the local application 3 recovers the text in the e-mail 4 without blocking the "normal" processing of this e-mail 4 by the e-mail management application. With the current capacities of communication networks, transmissions 6 and 7 occur rapidly and to the extent that the remote server 2 is also rapid, this "round trip" 6 and 7 with processing inside the remote server 2 occurs in a very short period of time.

The architecture according to the invention allows the remote server to be provided with hardware and software resources which are powerful in comparison with what it is possible to install in a single user's processing unit 1. The calculating capacity within the remote server 2 is optimized so that linguistic analyses can be carried out rapidly and efficiently.

Figure 2:
FIG. 2 is a view illustrating the text of an e-mail.

FIG. 2 shows an example of the text of e-mail 4. There is a header 10 from which a set of useful information such as the sender, the recipient, the date and the time of transmission and the subject of the e-mail can be recovered. The body of the text 11 contains information relating to a meeting. The foot of the page 12 contains the sender's contact details 13. The objective of the local application 1 is to recover all of the texts without processing them. Processing is carried out within the remote server 2 which produces an attached item 9 containing a structure representing the useful information. This attached item 9 can be a document comprising ASCII characters or can be of HTML type, and enhances the e-mail 4 which becomes an enhanced e-mail 8.

This information can be as follows:
 a meeting to be held on Jan. 17, 2008 at 11:00 at 14, rue Michel, 75014, Paris;
 a contact by the name of Ludovic Rugby with the e-mail address, land line and mobile phone numbers of this person;
 a category in the header, "MeetingConfirmed", indicating the kind of message.

The processing carried out within the remote server makes it possible, amongst other things, to format the useful information according to a predetermined model.

Of course, the invention is not limited to the examples which have just been described and numerous adjustments can be made to these examples without exceeding the scope of the invention.

The invention claimed is:

1. A method for enhancing an electronic message referred to as an e-mail, upon receipt in a user's e-mail inbox, this method comprising the following steps:
   a local application, associated with an email management application, acting on the e-mail inbox, which extracts a set of data comprising text contained in a body and a header of the e-mail, and a nature of the e-mail, contained in the e-mail, transmits said set of data to a remote server, receives a response originating from the remote server, and attaches this response in the form of an attachment to said e-mail; and
   said remote server receiving the set of data transmitted by the local application, analyzes the data so as to identify specific elements, and transmits said specific elements as a response to the local application,
   wherein the local application and the remote server operate asynchronously so that the e-mail can be consulted in the e-mail inbox by the user while the remote server carries out the data analysis.

2. The method according to claim 1, wherein the local application acts on the e-mail inbox as a "plug-in".

3. The method according to claim 1, wherein the specific elements comprise at least one of the elements chosen from the following group: date, time and location relating to a meeting, contacts or tasks.

4. The method according to claim 1, wherein the local application produces an item attached to the e-mail based on the response transmitted by the remote server.

5. The method according to claim 1, wherein the remote server incorporates the specific elements into a document in the form of an attached item that the local application attaches to the e-mail.

6. The method according to claim 1, wherein the response transmitted by the remote server contains a structured representation of the specific elements.

7. The method according to claim 1, wherein the local application produces and transmits a unique identifier to the remote server at the same time as the set of data.

8. The method according to claim 7, wherein the unique identifier identifies the user.

9. The method according to claim 7, wherein the unique identifier identifies the e-mail.

10. The method according to claim 7, wherein the unique identifier comprises an IP address making it possible to locate the local application.

11. The method according to claim 1, wherein the attachment to the e-mail is a document in HTML format containing at least one hypertext link.

12. A system for enhancing an electronic message referred to as an e-mail, upon receipt in an e-mail inbox contained in a processing unit, the system comprising:
   the processing unit comprises a local application, acting on the e-mail inbox, which is capable of extracting a set of data contained in the e-mail, transmitting said set of data to a remote server, receiving a response originating from the remote server, and attaching this response in the form of an attachment to said e-mail; and
   the remote server is capable of receiving the set of data transmitted by the local application, analyzing the data so as to identify specific elements, and transmitting these specific elements as a response to the local application,
   wherein the local application and the remote server operate asynchronously so that the e-mail can be consulted in the e-mail inbox by the user while the remote server carries out the data analysis.

13. The method according to claim 8, wherein the unique identifier identifies the e-mail.

14. The method according to claim 8, wherein the unique identifier comprises an IP address making it possible to locate the local application.

15. The method according to claim 9, wherein the unique identifier comprises an IP address making it possible to locate the local application.

16. The method according to claim 1, wherein the specific elements are generated by the remote server.

17. A method for enhancing an electronic message referred to as an e-mail, upon receipt in a user's e-mail inbox, this method comprising the following steps:
   a local application, acting on the e-mail inbox, which extracts a set of data comprising the text contained in the body and the header of the e-mail as well as the nature of this e-mail, contained in the e-mail, transmits said set of data to a remote server, receives a response originating from the remote server, and attaches this response in the form of an attachment to said e-mail; and
   said remote server receiving the set of data transmitted by the local application, analyzes the data so as to generate specific elements, and the remote server transmits said specific elements as a response to the local application, said specific elements being selected from date, time and location relating to a meeting, contacts or tasks,
   wherein the local application and the remote server operate asynchronously so that the e-mail can be consulted in the e-mail inbox by the user while the remote server carries out the data analysis.

18. The method according to claim 17, wherein the local application acts on the e-mail inbox as a "plug-in".

19. The method according to claim 17, wherein the local application produces an item attached to the e-mail based on the response transmitted by the remote server.

20. The method according to claim 17, wherein the remote server incorporates the specific elements into a document in the form of an attached item that the local application attaches to the e-mail.

* * * * *